(12) United States Patent
Guyan

(10) Patent No.: US 11,457,693 B2
(45) Date of Patent: *Oct. 4, 2022

(54) FOOTWEAR MIDSOLE WITH LATTICE STRUCTURE FORMED BETWEEN PLATFORMS

(71) Applicant: Under Armour, Inc., Baltimore, MD (US)

(72) Inventor: Alan Guyan, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/881,138

(22) Filed: May 22, 2020

(65) Prior Publication Data

US 2020/0281310 A1 Sep. 10, 2020

Related U.S. Application Data

(63) Continuation of application No. 16/008,759, filed on Jun. 14, 2018, now Pat. No. 10,702,012, which is a
(Continued)

(51) Int. Cl.
| | |
|---|---|
| *A43B 13/14* | (2006.01) |
| *A43B 13/18* | (2006.01) |
| *A43B 13/12* | (2006.01) |
| *A43B 3/00* | (2022.01) |
| *A43B 1/00* | (2006.01) |

(Continued)

(52) U.S. Cl.
CPC .......... *A43B 13/181* (2013.01); *A43B 1/0009* (2013.01); *A43B 3/0052* (2013.01); *A43B 7/32* (2013.01); *A43B 13/02* (2013.01); *A43B 13/125* (2013.01); *A43B 13/14* (2013.01); *A43B 13/186* (2013.01); *A43D 999/00* (2013.01); *B33Y 80/00* (2014.12)

(58) Field of Classification Search
CPC ..... A43B 1/009; A43B 13/18; A43B 13/1869; A43B 13/188; A43B 13/12; A43B 13/125; A43B 3/0052
USPC .................................. 36/25 R, 28, 30 R, 31
See application file for complete search history.

(56) References Cited

U.S. PATENT DOCUMENTS

| | | |
|---|---|---|
| 1,800,406 A | 4/1931 | De |
| 4,168,341 A | 9/1979 | Siedenstrang et al. |

(Continued)

FOREIGN PATENT DOCUMENTS

| | | |
|---|---|---|
| AU | 2008207351 | 3/2009 |
| CN | 1190560 | 8/1998 |

(Continued)

*Primary Examiner* — Marie D Bays
(74) *Attorney, Agent, or Firm* — Maginot, Moore & Beck LLP

(57) ABSTRACT

An article of footwear includes a midsole, an upper disposed above the midsole, and an outsole disposed below the midsole. The midsole includes a lattice structure having an upper side and a lower side, wherein the upper side is a user-facing side and the lower side is a ground-facing side. A first platform is integrally formed into the upper side of the lattice structure. A second platform is integrally formed into the lower side of the lattice structure. The lattice structure extends from the first platform to the second platform.

20 Claims, 15 Drawing Sheets

Related U.S. Application Data continuation of application No. 15/148,549, filed on May 6, 2016, now Pat. No. 10,010,134.

(60) Provisional application No. 62/158,950, filed on May 8, 2015.

(51) Int. Cl.
   *A43B 13/02* (2022.01)
   *B33Y 80/00* (2015.01)
   *A43B 7/32* (2006.01)
   *A43D 999/00* (2006.01)

(56) References Cited

U.S. PATENT DOCUMENTS

| | | |
|---|---|---|
| 4,170,078 A | 10/1979 | Moss |
| 4,245,406 A | 1/1981 | Landay et al. |
| 4,297,796 A | 11/1981 | Stirtz et al. |
| 4,316,335 A | 2/1982 | Glese et al. |
| 4,535,553 A | 8/1985 | Derderian et al. |
| 4,546,556 A | 10/1985 | Stubblefield et al. |
| 4,598,487 A | 7/1986 | Misevich |
| 4,663,865 A | 5/1987 | Telecemian et al. |
| 4,769,927 A | 9/1988 | Liggett et al. |
| 4,845,863 A | 7/1989 | Yung-Mao |
| 4,863,538 A | 9/1989 | Deckard |
| 4,864,738 A | 9/1989 | Horovitz |
| 4,938,816 A | 7/1990 | Beaman et al. |
| 4,970,807 A | 11/1990 | Anderie |
| 5,005,575 A | 4/1991 | Geri |
| 5,022,168 A | 6/1991 | Jeppson |
| 5,117,566 A | 6/1992 | Lloyd |
| 5,156,697 A | 10/1992 | Bourell et al. |
| D330,628 S | 11/1992 | Frachey |
| 5,174,049 A | 12/1992 | Flemming |
| 5,231,776 A | 8/1993 | Wagner |
| 5,255,451 A | 10/1993 | Tong |
| 5,261,169 A | 11/1993 | Williford |
| 5,311,674 A | 5/1994 | Santiyanont |
| 5,337,492 A | 8/1994 | Anderie et al. |
| 5,348,693 A | 9/1994 | Taylor et al. |
| D351,277 S | 10/1994 | Aveni |
| 5,353,526 A | 10/1994 | Foley |
| 5,367,791 A | 11/1994 | Gross et al. |
| 5,387,411 A | 2/1995 | Abrutyn |
| 5,408,761 A | 4/1995 | Gazzano |
| 5,461,800 A | 10/1995 | Luthi et al. |
| 5,465,509 A | 11/1995 | Fuerst et al. |
| 5,511,323 A | 4/1996 | Dahlgren |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,781 A | 11/1997 | Bury |
| 5,771,610 A | 6/1998 | McDonald |
| 5,822,886 A | 10/1998 | Luthi et al. |
| 5,876,767 A | 3/1999 | Mattes et al. |
| 5,896,680 A | 4/1999 | Kim et al. |
| 5,908,569 A | 6/1999 | Wilkening et al. |
| 5,983,524 A | 11/1999 | Polegato et al. |
| 6,006,412 A | 12/1999 | Bergmann et al. |
| 6,029,376 A | 2/2000 | Cass |
| 6,108,943 A | 8/2000 | Hudson et al. |
| 6,110,411 A | 8/2000 | Clausen et al. |
| 6,193,923 B1 | 2/2001 | Leyden et al. |
| 6,205,682 B1 | 3/2001 | Park |
| 6,259,962 B1 | 7/2001 | Gothait |
| 6,360,454 B1 | 3/2002 | Dachgruber et al. |
| 6,367,172 B2 | 4/2002 | Hernandez et al. |
| 6,412,196 B1 | 7/2002 | Gross |
| 6,533,885 B2 | 3/2003 | Davis et al. |
| 6,540,864 B1 | 4/2003 | Chi |
| 6,601,042 B1 | 7/2003 | Lyden |
| 6,601,321 B1 | 8/2003 | Kendall |
| 6,660,209 B2 | 12/2003 | Leyden et al. |
| 6,694,207 B2 | 2/2004 | Darrah et al. |
| 6,763,611 B1 | 7/2004 | Fusco |
| 6,769,202 B1 | 8/2004 | Luthi et al. |
| 6,817,112 B2 | 11/2004 | Berger et al. |
| 6,819,966 B1 | 11/2004 | Haeberli |
| 7,065,820 B2 | 6/2006 | Meschter |
| 7,077,638 B2 | 7/2006 | Leyden et al. |
| 7,148,286 B2 | 12/2006 | Baumann et al. |
| 7,207,125 B2 | 4/2007 | Jeppesen |
| 7,291,002 B2 | 11/2007 | Russell et al. |
| 7,424,783 B2 | 9/2008 | Meschter et al. |
| 7,484,318 B2 | 2/2009 | Finkelstein |
| 7,571,556 B2 | 8/2009 | Hardy et al. |
| 7,788,827 B2 | 9/2010 | Fogg et al. |
| 7,805,859 B2 | 10/2010 | Finkelstein |
| 8,522,454 B2 * | 9/2013 | Schindler ............ A43B 13/127 36/28 |
| 9,320,316 B2 | 4/2016 | Guyan et al. |
| 9,572,402 B2 | 2/2017 | Jarvis |
| 9,788,600 B2 | 10/2017 | Wawrousek |
| 10,010,134 B2 * | 7/2018 | Guyan ................ A43D 999/00 |
| 10,039,343 B2 * | 8/2018 | Guyan ................ A43B 13/141 |
| 10,231,511 B2 * | 3/2019 | Guyan .................... A43B 7/32 |
| 10,702,012 B2 * | 7/2020 | Guyan ................... A43B 13/02 |
| 2001/0001904 A1 | 5/2001 | Hernandez et al. |
| 2002/0023306 A1 | 2/2002 | Sajedi et al. |
| 2002/0050075 A1 | 5/2002 | Moretti et al. |
| 2003/0051372 A1 | 3/2003 | Lyden |
| 2003/0069807 A1 | 4/2003 | Lyden |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0159014 A1 | 8/2004 | Sommer |
| 2004/0168329 A1 | 9/2004 | Ishimaru |
| 2004/0261295 A1 | 12/2004 | Meschter |
| 2005/0076536 A1 | 4/2005 | Hatfield et al. |
| 2005/0188564 A1 | 9/2005 | Delgorgue et al. |
| 2005/0282245 A1 | 12/2005 | Meschter et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanaugh et al. |
| 2006/0143839 A1 | 7/2006 | Fromme |
| 2006/0201028 A1 | 9/2006 | Chan |
| 2006/0254087 A1 | 11/2006 | Fetcher |
| 2007/0022631 A1 | 2/2007 | Ho |
| 2007/0039204 A1 | 2/2007 | Wyszynski |
| 2007/0163147 A1 | 7/2007 | Cavanagh et al. |
| 2007/0227041 A1 | 10/2007 | Menghini |
| 2007/0232753 A1 | 10/2007 | Monsheimer et al. |
| 2007/0240333 A1 | 10/2007 | Le et al. |
| 2008/0060221 A1 | 3/2008 | Hottinger |
| 2008/0115389 A1 | 5/2008 | Hsieh et al. |
| 2008/0215176 A1 | 9/2008 | Borovinskih et al. |
| 2008/0289218 A1 | 11/2008 | Nakano |
| 2009/0012622 A1 | 1/2009 | James |
| 2009/0014424 A1 | 1/2009 | Meschter |
| 2009/0126225 A1 | 5/2009 | Jarvis |
| 2009/0145005 A1 | 6/2009 | Murphy et al. |
| 2009/0203275 A1 | 8/2009 | Dehn |
| 2009/0211119 A1 | 8/2009 | Moretti |
| 2009/0316965 A1 | 12/2009 | Mailling et al. |
| 2010/0050480 A1 | 3/2010 | Moretti |
| 2010/0229430 A1 | 9/2010 | Berger et al. |
| 2011/0265352 A1 | 11/2011 | Lin |
| 2011/0277349 A1 | 11/2011 | Kim |
| 2012/0011782 A1 | 1/2012 | Kolas |
| 2012/0055043 A1 | 3/2012 | Schindler et al. |
| 2012/0117825 A9 | 5/2012 | Jarvis |
| 2012/0151804 A1 | 6/2012 | Polegato et al. |
| 2013/0074363 A1 | 3/2013 | Adams et al. |
| 2014/0002019 A1 | 1/2014 | Park |
| 2014/0002677 A1 | 1/2014 | Schinker |
| 2014/0002903 A1 | 1/2014 | Shim |
| 2014/0020191 A1 | 1/2014 | Jones et al. |

(56) References Cited

U.S. PATENT DOCUMENTS

| | | | |
|---|---|---|---|
| 2014/0025978 A1 | 1/2014 | Tokunaga | |
| 2014/0026773 A1 | 1/2014 | Miller | |
| 2014/0029030 A1 | 1/2014 | Miller | |
| 2014/0029900 A1 | 1/2014 | Logan | |
| 2014/0030067 A1 | 1/2014 | Kim | |
| 2014/0109440 A1* | 4/2014 | McDowell | A43B 9/00 36/103 |
| 2014/0109441 A1 | 4/2014 | McDowell | |
| 2014/0115920 A1 | 5/2014 | McCue | |
| 2014/0182170 A1 | 7/2014 | Wawrousek | |
| 2014/0223776 A1 | 8/2014 | Wardlaw | |
| 2014/0226773 A1 | 8/2014 | Toth et al. | |
| 2014/0259787 A1 | 9/2014 | Guyan et al. | |
| 2014/0299009 A1 | 10/2014 | Miller et al. | |
| 2014/0300675 A1 | 10/2014 | Miller et al. | |
| 2014/0300676 A1 | 10/2014 | Miller et al. | |
| 2015/0033581 A1 | 2/2015 | Barnes | |
| 2015/0128448 A1 | 5/2015 | Lockyer | |
| 2015/0193559 A1 | 7/2015 | Musuvathy | |
| 2016/0051009 A1 | 2/2016 | Kormann | |
| 2016/0095385 A1 | 4/2016 | Nordstrom | |
| 2016/0242502 A1 | 8/2016 | Spanks | |
| 2016/0324260 A1 | 11/2016 | Guyan et al. | |
| 2016/0324261 A1 | 11/2016 | Guyan et al. | |
| 2016/0374428 A1 | 12/2016 | Kormann | |
| 2603/0360822 | 12/2016 | Guyan et al. | |
| 2017/0224053 A1 | 8/2017 | Truelsen | |
| 2017/0231322 A1 | 8/2017 | Gheorghian | |
| 2017/0332733 A1 | 11/2017 | Cluckers | |
| 2018/0271211 A1 | 9/2018 | Perrault | |
| 2018/0271213 A1 | 9/2018 | Perrault | |

FOREIGN PATENT DOCUMENTS

| | | |
|---|---|---|
| CN | 2357543 | 1/2000 |
| CN | 1252344 | 5/2000 |
| CN | 2676682 | 2/2005 |
| DE | 202004018209 | 1/2005 |
| DE | 102005023473 | 11/2006 |
| EP | 0526892 | 7/1993 |
| EP | 2564719 A1 | 6/2013 |
| EP | 2777420 A1 | 9/2014 |
| EP | 2424398 B1 | 12/2015 |
| ES | 2442448 A1 | 2/2014 |
| JP | 08-197652 | 8/1996 |
| JP | 09-057874 | 3/1997 |
| JP | 09-277384 A | 10/1997 |
| JP | 10-240964 | 9/1998 |
| JP | 2002-001827 A | 1/2002 |
| JP | 2004-042545 A | 2/2004 |
| JP | 2009-045244 A | 3/2009 |
| WO | 0053398 | 9/2000 |
| WO | 2001024575 | 4/2001 |
| WO | 2004018966 | 3/2004 |
| WO | 2004073416 | 9/2004 |
| WO | 29004092346 | 10/2004 |
| WO | 2006034261 | 3/2006 |
| WO | 2006047259 | 5/2006 |
| WO | 2006098715 | 9/2006 |
| WO | 2008010855 | 1/2008 |
| WO | 2009035831 | 3/2009 |
| WO | 2009114715 | 3/2009 |
| WO | 2009055451 | 4/2009 |
| WO | 2009086520 | 7/2009 |
| WO | 2010126708 A2 | 11/2010 |
| WO | 2014008331 A2 | 1/2014 |
| WO | 2014009587 | 1/2014 |
| WO | 2014015037 A2 | 1/2014 |
| WO | 2014100462 A1 | 6/2014 |

* cited by examiner

FOOTWEAR MIDSOLE WITH LATTICE STRUCTURE FORMED BETWEEN PLATFORMS

CROSS-REFERENCE TO RELATED APPLICATIONS

This is a continuation of U.S. patent application Ser. No. 16/008,759, filed Jun. 14, 2018, which is a continuation of U.S. patent application Ser. No. 15/148,549, filed May 6, 2016, which claims priority from U.S. Provisional Patent Application Ser. No. 62/158,950, filed May 8, 2015, the entire contents of which are incorporated herein by reference.

FIELD

This disclosure relates generally to footwear and specifically to support arrangements for articles of footwear.

BACKGROUND

FIG. 13 shows an article of footwear in the form of a shoe 10 to be worn on a foot of a user with a portion of the shoe 10 cut away so that the inside of the shoe 10 is partially visible. The shoe 10 includes an upper 14 and a sole 18 coupled to the upper 14. The upper 14 covers the top and sides of the user's foot, and the sole 18 covers the bottom of the user's foot and makes contact with the ground. The sole 18 typically includes an insole 22, a midsole 26, and an outsole 30 which cushion and protect the user's foot while the user makes contact with the ground. The insole 22 contacts the user's foot, the outsole 30 contacts the ground, and the midsole 26 is arranged between the insole 22 and the outsole 30. The insole 22 generally provides a comfortable surface for contact with the user's foot and is typically comprised of a thin layer of a man-made material such as, for example, ethylene vinyl acetate (EVA). The midsole 26 generally provides most of the cushioning and shock absorption for the foot of the user and is typically comprised of a polymer such as, for example, polyurethane, surrounding another material such as, for example, a foam, a gel, or recesses filled with air. The outsole 30 generally provides a durable surface which can sustain repeated impact and friction with the ground and is typically comprised of a durable material, such as, for example, carbon rubber or blown rubber.

The sole 18 includes a heel end 34 arranged where a user's heel is positioned when wearing the shoe 10 and a toe end 38 arranged opposite the heel end 34 where the user's toes are positioned when wearing the shoe 10. The sole 18 also includes a medial side 42 arranged closest to the user's center of symmetry when wearing the shoe 10 and a lateral side 46 arranged opposite the medial side 42 farther from the user's center of symmetry when wearing the shoe 10.

Turning now to FIG. 14 and FIG. 15, schematic drawings of a user's foot 50 are shown including a heel 54, toes 56, an arch 58, a medial side 60, and a lateral side 62. FIG. 2 depicts a perspective lateral side view of the bone structure of the foot 50, and FIG. 3 depicts a bottom view of the foot 50 including a plurality of regions located relative to the heel 54, toes 56, arch 58, medial side 60, and lateral side 62. A calcaneus region 66 (shown in FIG. 14) on the bottom of the foot 50 is located substantially beneath a calcaneus bone 68 (shown in FIG. 14) of the user, near the heel 54. A talus region 70 (shown in FIG. 15) on the bottom of the foot 50 is located substantially beneath a talus bone 72 (shown in FIG. 14) of the user, between the heel 54 and the arch 58. A longitudinal arch region 74 (shown in FIG. 15) on the bottom of the foot 50 is located substantially beneath a navicular bone 76, a cuboid bone 78 and cuneiform bones 80 (shown in FIG. 14) of the user, near the arch 58. A metatarsal region 82 (shown in FIG. 15) on the bottom of the foot 50 is located substantially beneath metatarsal bones 84 (shown in FIG. 14) of the user, between the arch 58 and the toes 56. A ball of the foot region 86 (shown in FIG. 15) on the bottom of the foot 50 is located substantially beneath the metatarsal-phalangeal joints 88 and sesamoids 90 (shown in FIG. 14) of the user, between the arch 58 and the toes 56 and closer to the medial side 60 than the lateral side 62. A toe region 92 (shown in FIG. 15) on the bottom of the foot 50 is located substantially beneath phalangeal bones 94 (shown in FIG. 14) of the user, near the toes 56.

When propelling himself on his feet, the user applies different amounts of pressure at different times to the various bones in each foot 50 during what is known as a gait cycle. For example, during a typical walking motion, the gait cycle begins when the user first contacts the ground with the heel 54 of his foot 50, thereby applying pressure to the calcaneus bone 68. As the user shifts his weight forward on his foot 50, he applies less pressure to the calcaneus bone 68 and begins to apply pressure to the talus bone 72, the navicular bone 76, the cuboid bone 78, and the cuneiform bones 80. As the user begins to propel himself off his foot 50, he applies less pressure to the talus bone 72, the navicular bone 76, the cuboid bone 78, and the cuneiform bones 80 and begins to apply pressure to the metatarsal bones 84. As the user propels himself forward, he applies pressure along the metatarsal bones 84 and to the metatarsal-phalangeal joints 88 and sesamoids 90. Finally, as the user begins to toe off and end contact with the ground, he applies less pressure to the metatarsal-phalangeal joints 88 and sesamoids 90 and applies pressure to the phalangeal bones 94. Finally, to toe off, the user applies pressure to the phalangeal bones 94 to propel forward. The user then lifts his foot 50 into a leg swing, and places it down in a location forward relative to where he lifted it. When the user places his foot 50 down again, he first contacts the ground with the heel 54, beginning a new cycle of the walking motion.

Many styles of forward propulsion, including many styles of walking and running, apply a gait cycle substantially similar to that described above. In some styles of forward propulsion, such as, for example, sprinting or shuffling, different amounts of pressure are applied to different portions of the foot 50 for different amounts of time. Additionally, the particular amounts of pressure applied to different portions of the foot 50 can vary from one individual to another. For example, some individuals apply more pressure to the medial side 60 than the lateral side 62 as they progress through the gait cycle. This particular application of pressure is known as pronation. In contrast, some individuals apply more pressure to the lateral side 62 than the medial side 60 as they progress through the gait cycle. This particular application of pressure is known as supination. Additionally, some individuals apply more pressure to their heels 54 when contacting the ground and some contact the ground with a portion of their feet nearer to the arch 58.

Shoes are designed to support and protect the feet of users during gait cycles to provide comfort and to promote efficient propulsion. However, due to differences between individuals in both foot anatomy and personal gait cycle style, some shoes are more comfortable and useful for some users than others. Additionally, producing a shoe configured to meet the variety of needs during all stages of the gait cycle can include producing a large number of different specialized parts which must be assembled into the shoe. Production and assembly of parts are contributing factors to the cost of the shoe. In general, a shoe having a larger number of parts is more expensive to produce than a shoe having a smaller number of parts. In view of the foregoing, it would be advantageous to provide a shoe that is comfortable and useful for a user and that is inexpensive to produce. It would also be advantageous to provide a shoe with a support arrangement that can be easily customized to meet the unique needs of various foot anatomies and individual gait styles. It would be of further advantage if the shoe were configured to provide improved performance qualities for the user, such as improved stability and energy return qualities.

SUMMARY

In accordance with one exemplary embodiment of the disclosure, there is provided an article of footwear comprising a midsole, an upper disposed above the midsole, and an outsole disposed below the midsole. The midsole comprises a lattice structure including an upper side and a lower side, wherein the upper side is a user-facing side and the lower side is a ground-facing side. A first platform is integrally formed into the upper side of the lattice structure. A second platform is integrally formed into the lower side of the lattice structure. The lattice structure extends from the first platform to the second platform.

In accordance with another exemplary embodiment of the disclosure a method is provided for manufacturing a midsole for an article of footwear. The method comprises printing a midsole. The midsole includes a lattice structure comprising a network of laths extending from an upper, user-facing side to a lower, ground-facing side. The lattice structure further comprises a first platform integrally formed into the upper, user-facing side of the lattice structure, and a second platform integrally formed into the lower, ground-facing side of the lattice structure. The network of laths extend from the first platform to the second platform. The method further comprises coupling an upper to the upper, user-facing side of the midsole. The method also comprises coupling an outsole to the lower, ground-facing side of the midsole.

In accordance with yet another exemplary embodiment of the disclosure an article of footwear comprises an upper, an outsole, and a midsole positioned between the upper and the outsole. The midsole includes an upper platform, a lower platform, and a lattice structure comprising a network of laths extending between the upper platform and the lower platform. The laths are configured as parallel wave structures in multiple integrally formed layers wherein the wave structures in a first layer are transverse to the wave structures in a second layer.

The above described features and advantages, as well as others, will become more readily apparent to those of ordinary skill in the art by reference to the following detailed description and accompanying drawings.

DETAILED DESCRIPTION

Figure 1:
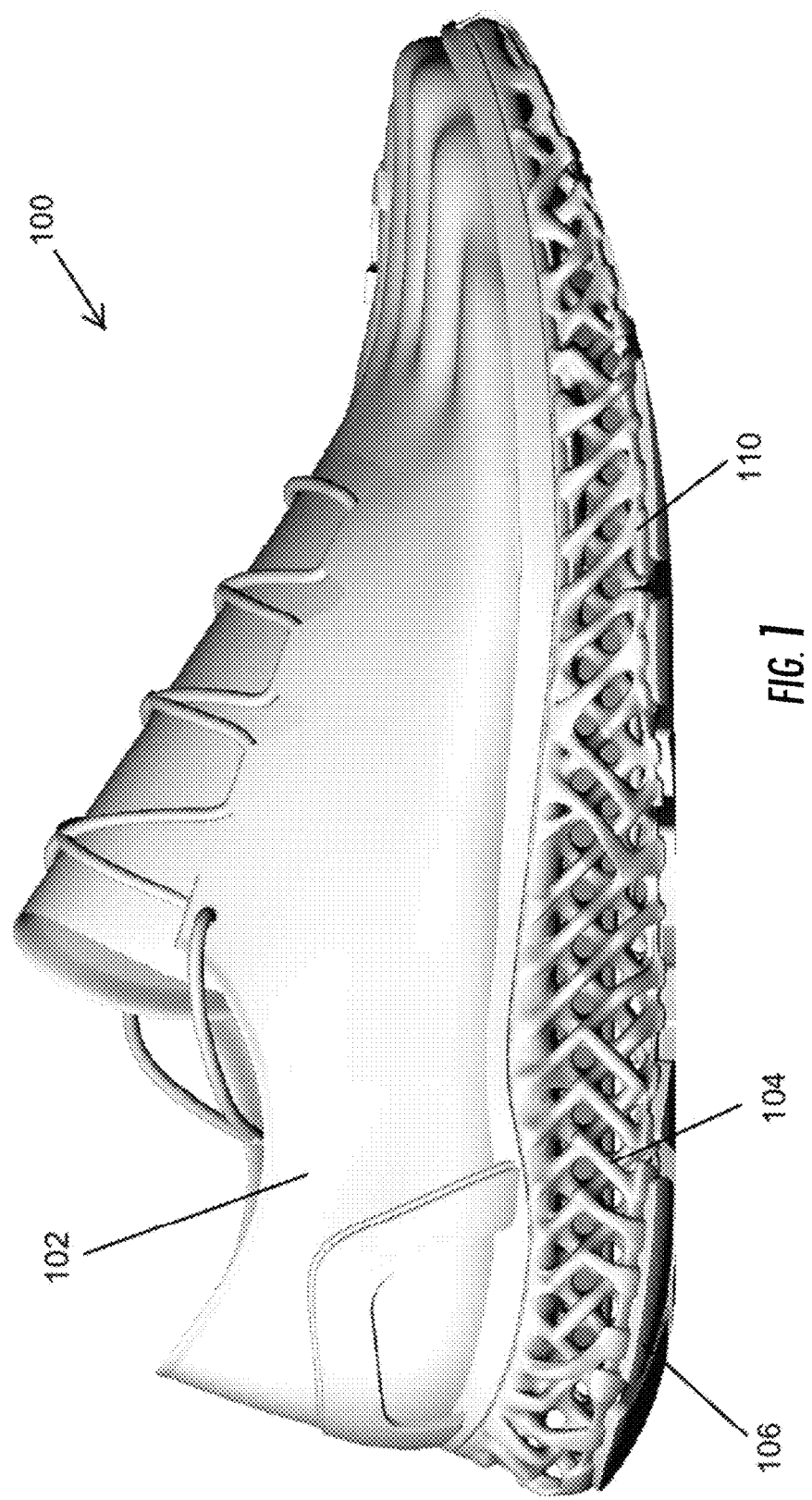
FIG. 1 is a side view of an article of footwear including a midsole comprising a lattice structure.

With reference now to FIGS. 1-6, an article of footwear 100 includes an upper 102, a midsole 104 and an outsole 106. The midsole 104 is provided between the upper 102 and the outsole 106 and is formed of two components. The first component of the midsole 104 is a lattice structure 110. The second component of the midsole 104 is a compressible and resilient insert 150 disposed on top of or within the lattice structure 110. In combination, the lattice structure 110 and the resilient insert 150 provide a midsole 104 that provides increased stability and energy return qualities.

The upper 102 includes a plurality of components that cover the foot of a user when the article of footwear 100 is worn. The upper 102 may include any of various sections, including the vamp, the heel, the tongue, and any of various other components such as fabric panels, leather strips, foam padding, polymer support structures, or fastening elements. The upper 102 in combination with the insole (not shown) form a foot cavity for the article of footwear 100. The insole is positioned under the foot of the wearer and abuts the midsole 104. The insole may include various components such as a strobel board and a sock liner. Various methods may be used to attach the upper 102 and the insole to the midsole 104, including the use of adhesives, welting, or any of various other methods as will be recognized by those of ordinary skill in the art.

The components of the upper 102 may be presented in any of various configurations and thereby provide different forms of the footwear. For example, the upper 102 may be configured as a low-cut running shoe, a high-top basketball shoe, or any of various other forms of athletic shoes. The upper 102 may also be configured with various tightening mechanisms to secure the article of footwear 100 to the foot of the wearer. For example, the upper 102 may be configured such that the article of footwear 100 is a lace-up shoe, a slip-on shoe, or a strap-tightened boot.

In addition to being provided in any of various forms and configurations, the upper 102 may also be comprised of any of various materials. For example, the upper may include polyester, elastane, mesh, synthetic leather or natural leather, or any of various other materials or combinations thereof. The materials used on the upper 102 may depend, in part, on the particular type of footwear formed by the upper 102. For example, heavier and more rugged materials such as leather may be more prevalent on the upper 102 if the article of footwear is provided in the form of a boot or a cleat. Conversely, light-weight mesh or elastane fabric may be more prevalent on the upper 102 if the article of footwear is provided in as a running shoe.

Figure 2:
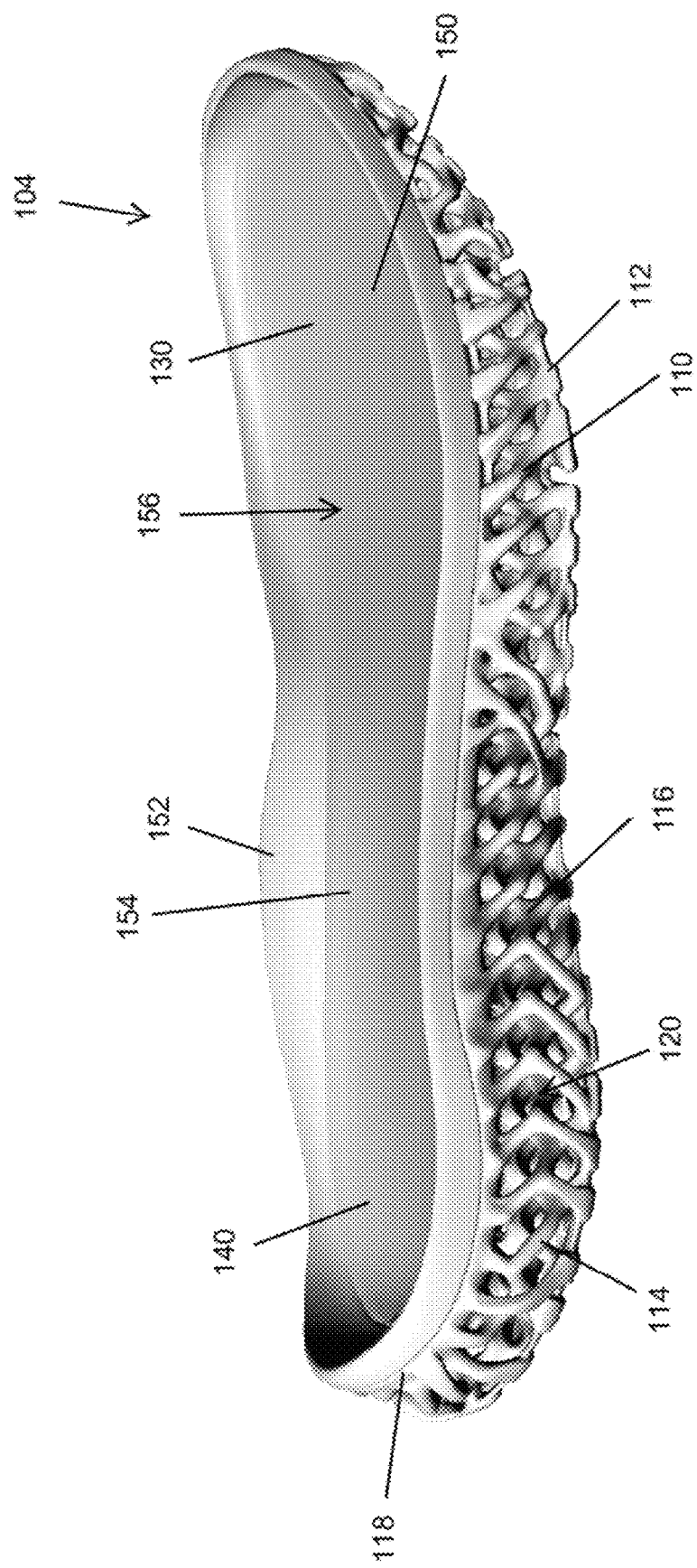
FIG. 2 is an upper perspective view of the midsole of FIG. 1 including a resilient insert positioned in a recess formed within the lattice structure.
Figure 3:
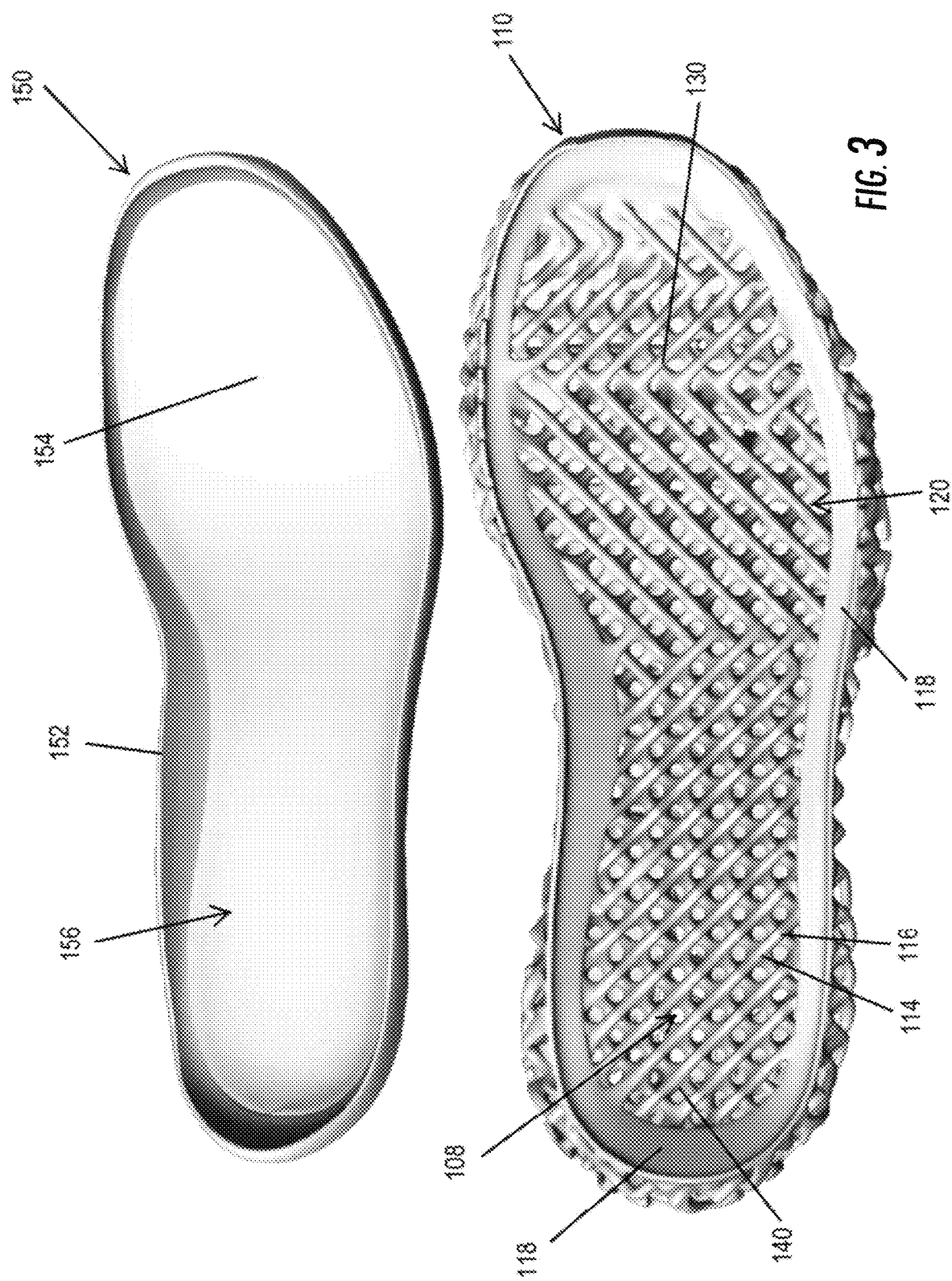
FIG. 3 is a top view of the midsole of FIG. 2 with the resilient insert removed from the lattice structure to expose a recess in the lattice structure.

The midsole 104 is connected to the upper 102. With particular reference now to FIGS. 2-3, the midsole 104 is formed of two components, including the lattice structure 110 and the resilient insert 150. The lattice structure 110 includes a lower platform 112, a plurality of interconnected laths 114, and an upper platform in the form of an upper shelf 118. The laths 114 are joined together at nodes 116 to provide a network of laths that extends between the lower platform 112 and the upper shelf 118 of the lattice structure 110. The laths 114 may be configured and connected in any of various configurations to form the lattice structure. In at least one embodiment as shown in FIGS. 1-6 (and discussed in further detail below with reference to FIGS. 11 and 12) the laths 114 are generally wave-like structures, forming alternating layers of parallel waves and perpendicular waves, with each layer joined to an adjacent layer at the peaks and valleys of the waves. Accordingly, the nodes 116 are formed at the peaks and the valleys of the wave-like laths 114.

Figure 4:
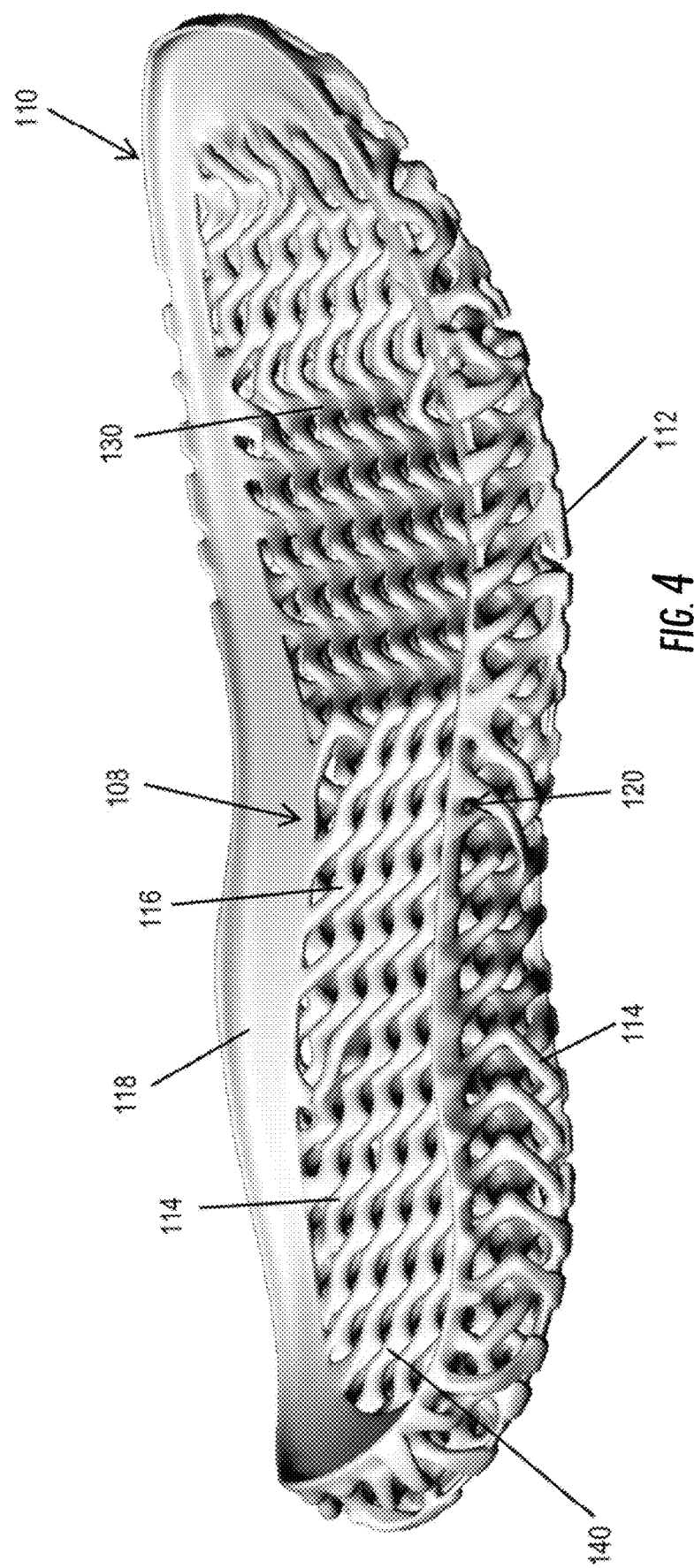
FIG. 4 is a side perspective view of the lattice structure of FIG. 2.

With continued reference to FIGS. 2-4, openings 120 (which may also be referred to herein as "voids") are formed in the lattice structure 110 between the plurality of laths 114 and the plurality of nodes 116. The openings 120 form a network of passages through the lattice structure 110. These passages include direct and indirect passages through the lattice structure 110 from the lateral side to the medial side of the lattice structure, and from the front to the back of the lattice structure 110. Accordingly, air and moisture are permitted to pass through the midsole in a lateral direction from the medial side to the lateral side of the lattice structure 110, and vice-versa, and from the front to the back of the lattice structure 110, and vice-versa.

The upper shelf 118 is formed on an upper, user-facing side of the lattice structure 110 and provides a relatively smooth and continuous surface that extends around the upper perimeter of the lattice structure 110. In the embodiment of FIGS. 1-6, the upper shelf 118 extends only around the perimeter of the lattice structure 110 without extending into the center of the lattice structure. In this embodiment, the upper shelf 118 has a width between 3 mm and 30 mm at various locations along the upper shelf 118. For example, the width of the upper shelf 118 near the heel region is about 26 mm, while the width of the upper shelf 118 near the toe region is about 7 mm. The smooth and continuous surface of the upper shelf 118 is contoured to match that of the lower surface perimeter of the resilient insert 150. Accordingly, the resilient insert 150 is configured to receive and closely engage the upper shelf 118, and the lattice structure 110, providing a convenient location for securing the resilient insert 150 and/or the upper 102 to the lattice structure 110.

At the same time, the lattice structure 110, including the upper shelf 118 is configured to support the resilient insert 150 and/or the upper 102 within the article of footwear 100.

The upper shelf 118 generally provides the highest portion of the lattice structure 110. In the disclosed embodiment, the upper shelf 118 is provided as a narrow platform in the form of a rim that extends around the upper perimeter of the lattice structure 110 but does not completely cover the network of laths 114 and nodes 116 on the upper surface of the lattice structure 110. However, in various alternative embodiments, the upper shelf 118 may be configured as a wide platform that extends completely across the lattice structure 110 to completely cover the network of laths 114 and nodes 116 on the upper surface of the lattice structure 110.

As shown in FIGS. 3 and 4, a recess 108 is formed in the lattice structure 110 which extends downward from the upper shelf 118 and into the network of laths 114 and nodes 116. In the embodiment of FIGS. 3 and 4 this recess 108 extends completely across the lattice structure 110 from a forefoot region 130 to a heel region 140 of the midsole 104, but only extends partially downward into the network of laths 114. However, in other embodiments, such as the embodiment of FIGS. 7-8 described in further detail below, the recess 108 extends across only a portion of the foot of the wearer, such as across a portion of the forefoot region 130 or a portion of the heel region 140. In addition, the recess 108 may also extend downward to a greater degree than the embodiment of FIGS. 3 and 4. For example, in the embodiment of FIGS. 7-8 the recess extends completely through the lattice structure 110. Accordingly, it will be recognized that the recess 108 may be provided in any of various shapes and dimensions, and is typically configured to receive and retain the resilient insert 150 within the midsole 104. Additionally, it will be recognized that one or more recesses 108 may be provided in each lattice structure 110, with each recess 108 configured to receive a resilient insert 150.

Figure 5:
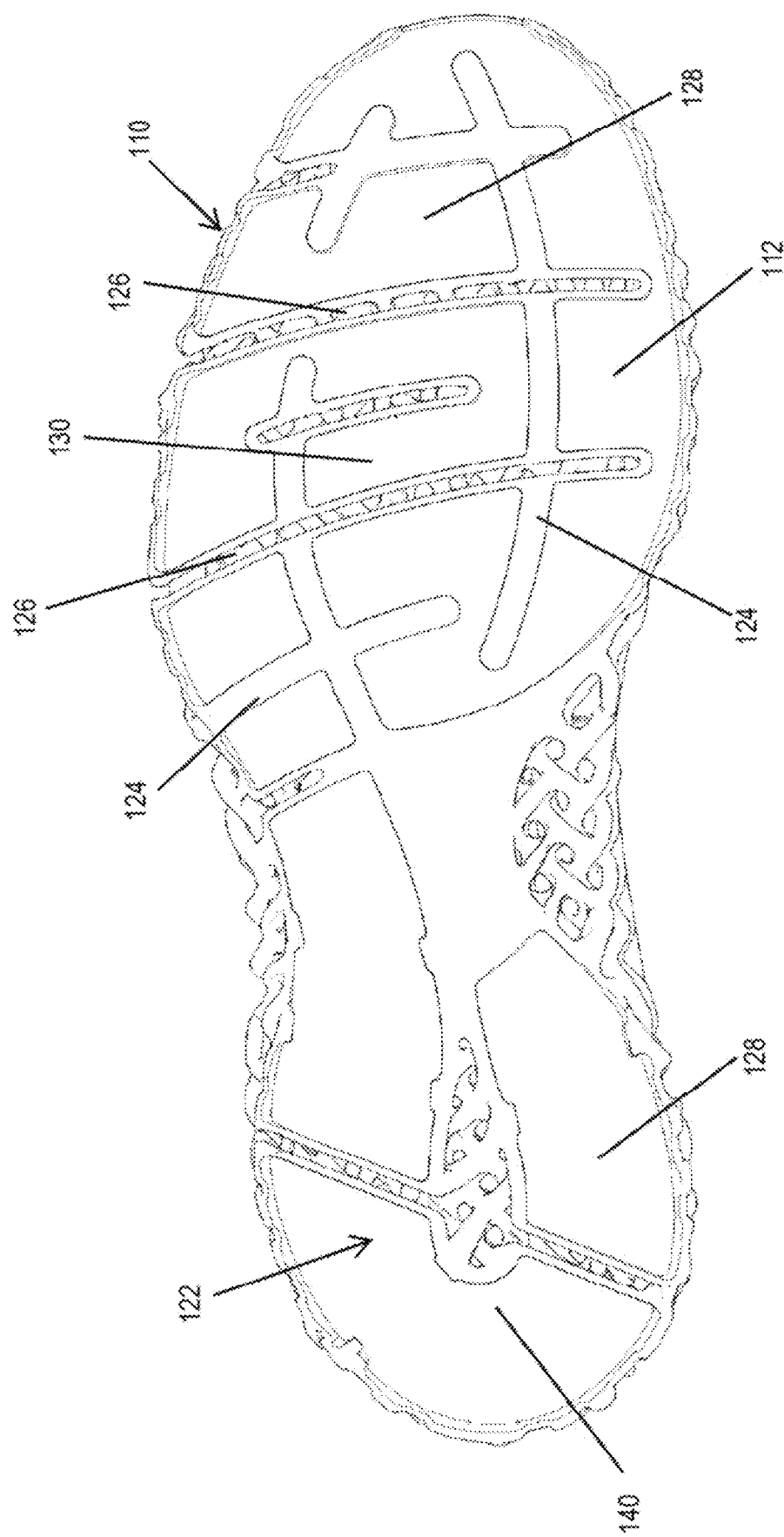
FIG. 5 is a bottom view of the lattice structure of FIG. 2.

With particular reference now to FIG. 5, the lower platform 112 of the lattice structure 110 is provided on the opposite side of the lattice structure 110 from the upper shelf 118. The lower platform 112 provides the general footprint or outline shape for the bottom of the article of footwear 100. The lower platform 112 includes an upward-facing surface which is connected to the network of laths 114 and a downward-facing surface 122 which engages the outsole 106. The downward-facing surface 122 is substantially flat and smooth and includes a plurality of support structures in the form of ribs 124 and a plurality of openings in the form of grooves 126. The plurality of ribs 124 extend outward from the surrounding portions of the downward-facing surface 122. The plurality of grooves 126 may cut completely through the lower platform 112 and into the recess 108 or the laths 114 of the lattice structure 110. While the grooves 126 may provide openings that result in a discontinuous lower platform 112, it will be recognized that in at least some embodiments, the entire lower platform may be provided as a continuous surface. Also, in the disclosed embodiment, the lower platform 112 spans from a medial side to a lateral side of the article of footwear 100 in a midfoot region of the article of footwear (e.g., the spans adjacent grooves 126 in FIG. 5). In other alternative embodiments, the grooves may result in a completely discontinuous surface such that the lower platform does not span from the medial side to the lateral side of the article of footwear. The ribs 124 and grooves 126 may be advantageously arranged in any of various configurations with the ribs 124 offering additional support and stability for the midsole 104, and the grooves offering additional flexibility for the midsole 104. Relatively flat and smooth sections 128 are provided between the ribs 124 and grooves 126. As described in further detail below, outsole pads 160 are connected to each of the relatively flat and smooth sections 128 of the lattice structure 110.

The lattice structure 110 may be comprised of any of various materials. In at least one embodiment, the lattice structure 110 is comprised of a polymer, such as nylon, PTFE or any of various other thermoplastic polymers. The polymers used to form the lattice structure 110 may be advantageously appropriate for use in association with various three dimensional (3D) printing processes, such as selective laser sintering, fused deposition modeling, or related 3D printing processes. In addition to being a material appropriate for use with 3D printing processes, the material used for the lattice structure 110 should also provide the appropriate qualities desired for the midsole such as strength and resiliency. Use of the appropriate material for the lattice structure 110 will allow the lattice structure 110 to provide good stability and energy return for the midsole 104. In the embodiment of FIGS. 1-6, the lattice structure 110 is a unitary component with the lower platform 112, laths 114, nodes 116, and upper shelf 118 all integrally formed together during a 3D printing process. Because the lattice structure 110 is formed by 3D printing, the various components of the lattice structure, including the lower platform 112, laths 114 and upper shelf 118 may be integrally formed without gate marks, sprue marks, parting line marks and ejector pin marks as are common with molded parts.

With particular reference now to FIGS. 2 and 3, the resilient insert 150 is positioned upon and at least partially within the lattice structure 110. The resilient insert 150 is generally provided as a unitary panel or block-like component that is inserted into the recess 108 of the lattice structure 110. The resilient insert 150 may be provided in any of various shapes and sizes. For example, in the embodiment of FIGS. 2-3, the insert is a relatively thin panel that is provided in the general shape of a footprint. In this embodiment, the resilient insert 150 includes a perimeter edge 152 and a foot bed 154 with a relatively flat and smooth upper surface 156 extending from side-to-side of the perimeter edge. The foot bed 154 is slightly depressed relative to the perimeter edge 152 such that the foot bed 154 rests slightly downward from the perimeter edge 152. The perimeter edge 152 of the resilient insert 150 is configured to abut the upper shelf 118 of the lattice structure 110. The foot bed 154 is configured to rest within the recess 108 of the lattice structure 110 with a lower surface of the resilient insert engaging the laths 114 and nodes 116 or the lower platform. An adhesive or other connecting means may be used to secure the resilient insert 150 in place within the lattice structure 110.

While the resilient insert 150 has been described in the embodiment of FIGS. 2-3 as having a size and shape that extends substantially over the entirety of the lattice structure 110, in other embodiments the resilient insert 150 may have a different shape or may have more of a block-like structure. In any event, the resilient insert 150 is generally configured to provide any of various cushioning, energy return, support or other qualities in the region of the midsole 104 associated with the resilient insert 150.

In addition to having various sizes and shapes, the resilient insert 150 may also be positioned in various locations within the lattice structure 110. For example, in the embodiment of FIGS. 2-3, the resilient insert 150 extends across and covers the lattice structure 110. In this embodiment the resilient insert 150 may be designed to cooperate with the network of laths 114 and provide a generally soft yet resilient cushioning component for the foot of the wearer. In other embodiments, the resilient insert 150 may only be positioned in one limited area of the lattice structure 110, such as the heel region 140 or the forefoot region 130 of the midsole 104. In these embodiments, the resilient insert 150 is configured to provide additional support or cushioning in only the targeted area where the resilient insert 150 is located. In yet other embodiments, several resilient inserts may be provided in different regions of the midsole 104, such as one resilient insert 150 in each of the forefoot region and the heel region, or such as two separate inserts in the heel region.

In at least some embodiments, the resilient insert 150 is designed and dimensioned to fill the entire void provided by the recess 108. The resilient insert 150 abuts the lattice structure 110 such that the resilient insert 150 is held securely in place within the recess 108. Accordingly, the portion of the resilient insert 150 that is to fill the recess 108 is typically includes dimensions that are similar to the dimensions of the recess 108. However, in at least some embodiments, the portion of the resilient insert 150 that is inserted into the recess 108 may be dimensioned significantly different than that of the recess such that voids remain in the recess 108 even when the resilient insert 150 is positioned therein.

The resilient insert 150 may be comprised of any of various materials adapted to provide the desired cushioning, energy return, or support needs in the area associated with the insert. In at least one embodiment, the resilient insert 150 may be comprised of ethylene-vinyl acetate (EVA) or other elastomeric polymer material that is relatively soft and resilient. For example, the resilient insert 150 may be comprised of EVA foam that is generally lightweight and provides a desired degree of cushioning and resiliency for the resilient insert 150. The insert may be formed by molding or die-cutting the EVA foam into a desired shape. After the resilient insert 150 is formed, it is placed in the recess 108 of the lattice structure 110 where it is securely retained to complete the midsole 104.

As particularly shown in FIGS. 2-3, the midsole 104 includes two compressive elements: the lattice structure 110 and the resilient insert 150. It has been determined that the combination of the resilient insert 150 and the lattice structure 110 together provide advantageous features with respect to increased stability, cushioning, and energy return in particular areas of the midsole 104. Accordingly, by utilizing the resilient insert 150 in combination with the lattice structure 110, the midsole 104 may be tuned to provide desired characteristics and wear performance. By using one or more inserts in specific areas of the lattice structure, different performance characteristics may be provided in different regions of the midsole. As explained in the following examples, testing of various inserts in combination with the lattice structure 110 supports the desirability of the combination of the lattice structure with one or more inserts 150.

Figure 6:
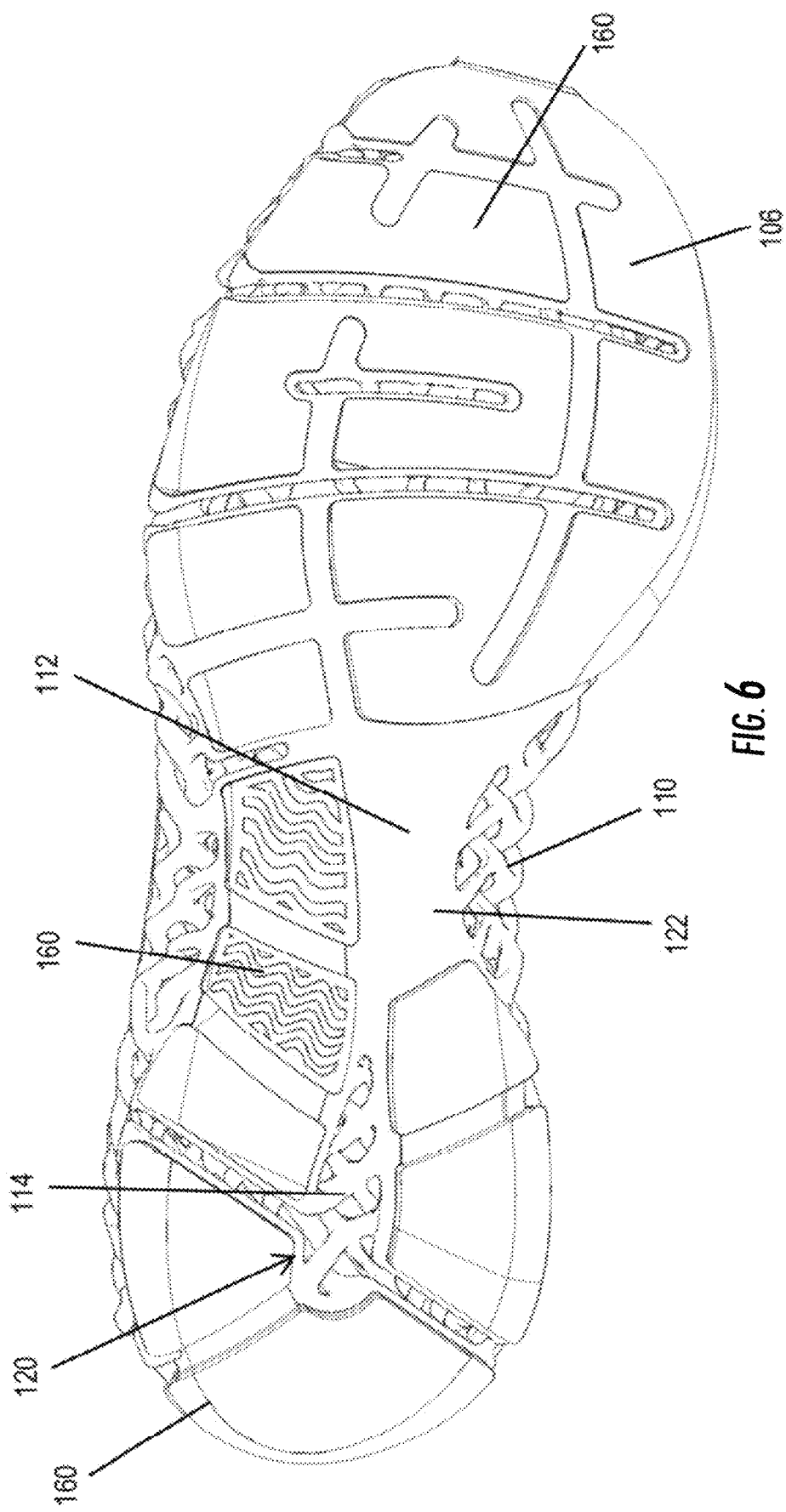
FIG. 6 is a bottom view of the lattice structure of FIG. 2 with an outsole for the article of footwear attached thereto.

With particular reference now to FIG. 6, the outsole 106 is provided by the durable pads 160 that are connected to the bottom surface of the midsole 104. The durable pads 160 are strips or panels of material formed in shapes that fit within the sections 128 of the downward facing surface 122 of the lattice structure 110. An adhesive or other appropriate means may be used to connect the durable pads 160 to the downward facing surface 122 of the lattice structure 110. While a plurality of durable pads 160 form the outsole 106 in the embodiment of FIG. 11, a single durable pad that substantially or completely covers the downward facing surface 122 of the midsole may alternatively be used to form the outsole 106. The one or more durable pads 160 may be formed from any of various materials that provide the desired features and performance qualities of an outsole. In at least one embodiment, the durable pads are comprised of exterior grade EVA foam. The exterior grade EVA foam is a resilient material that provides an appropriate measure of traction and wear resistance for the outsole 106.

Figure 7:
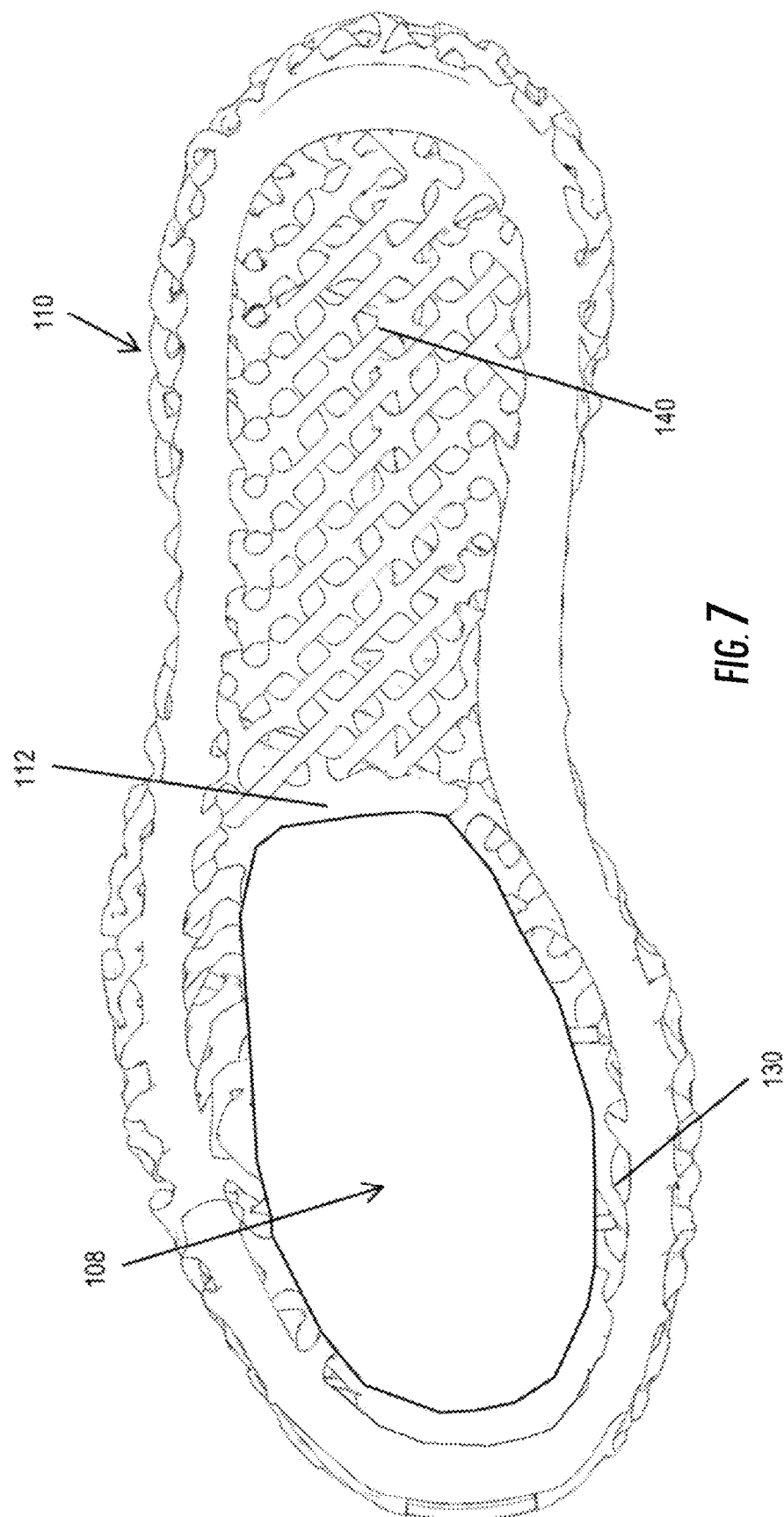
FIG. 7 is a top view of an alternative embodiment of the midsole lattice structure of FIG. 2 including a recess that extends completely through the lattice structure in a forefoot region of the midsole.
Figure 8:
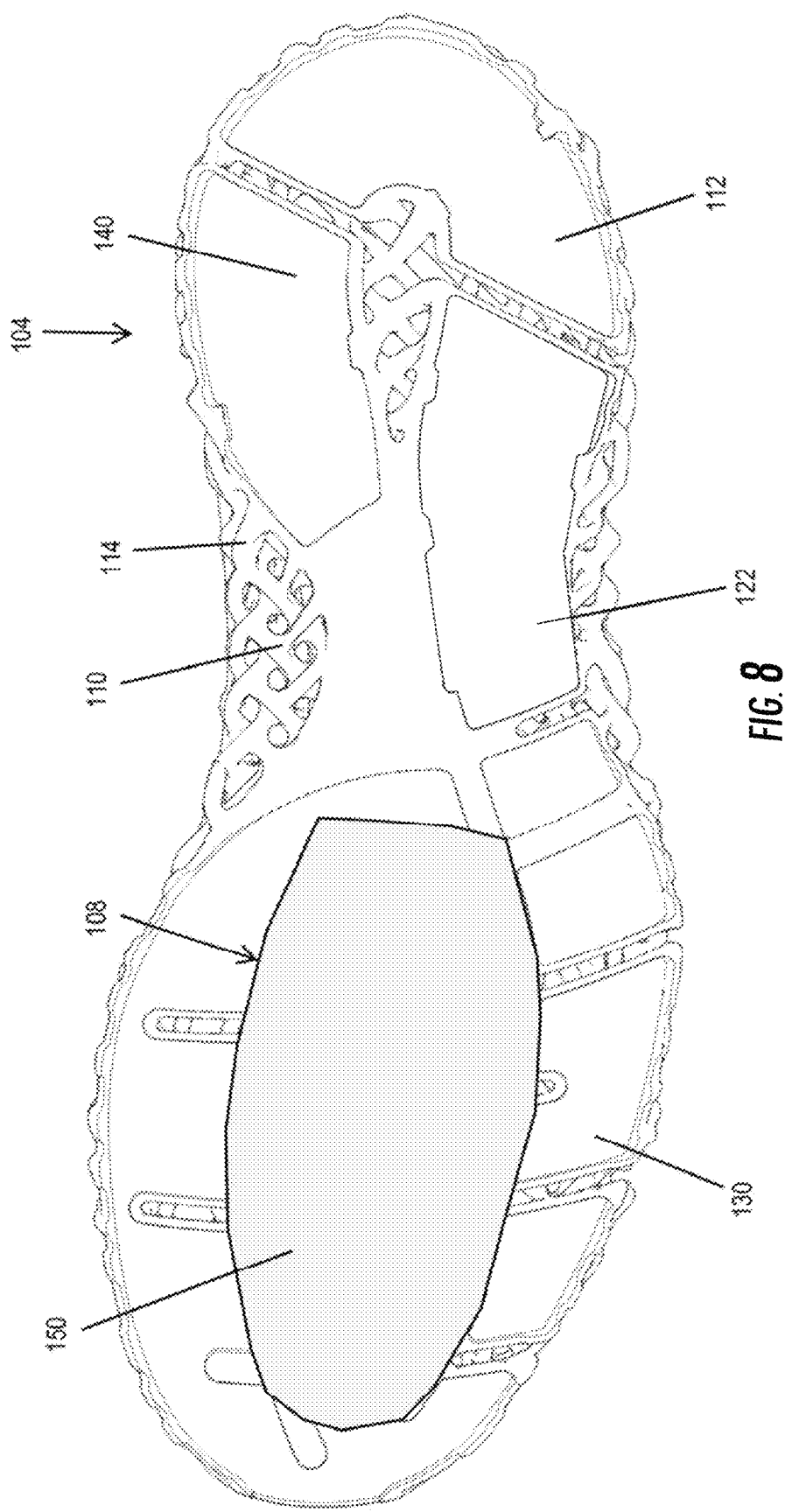
FIG. 8 is a bottom view of the lattice structure of FIG. 7 with a resilient insert positioned in the recess.

As noted previously, it will be recognized that the lattice structure 110 and the resilient insert 150 may be provided on the midsole 104 in any of various designs and configurations. With reference now to FIGS. 7 and 8, in at least one embodiment, the lattice structure 110 spans the length of the midsole from end-to-end, but the resilient insert 150 is provided in only one region of the midsole 104. For example, in the embodiment of FIGS. 7 and 8, the resilient insert 150 is only provided within the forefoot region 130 of the midsole. In this embodiment, the recess 108 extends the complete height of the midsole 104, extending upward completely through the lower platform 112 and the network of laths 114 and nodes 116. As shown in FIG. 7, a relatively large direct passage through the lattice structure 110 is provided by the recess 108. As shown in FIG. 8, when the resilient insert 150 is positioned in the recess 108, the resilient insert 150 is exposed on the downward facing surface 122 of the lower platform 112. In this embodiment, the recess 108 in the lattice structure 110 may or may not extend to other parts of the midsole 104, such as the heel region 140. If the recess 108 does extend to other parts of the lattice structure one or more additional resilient inserts 150 may be positioned within those additional portions of the lattice structure 110.

Figure 9:
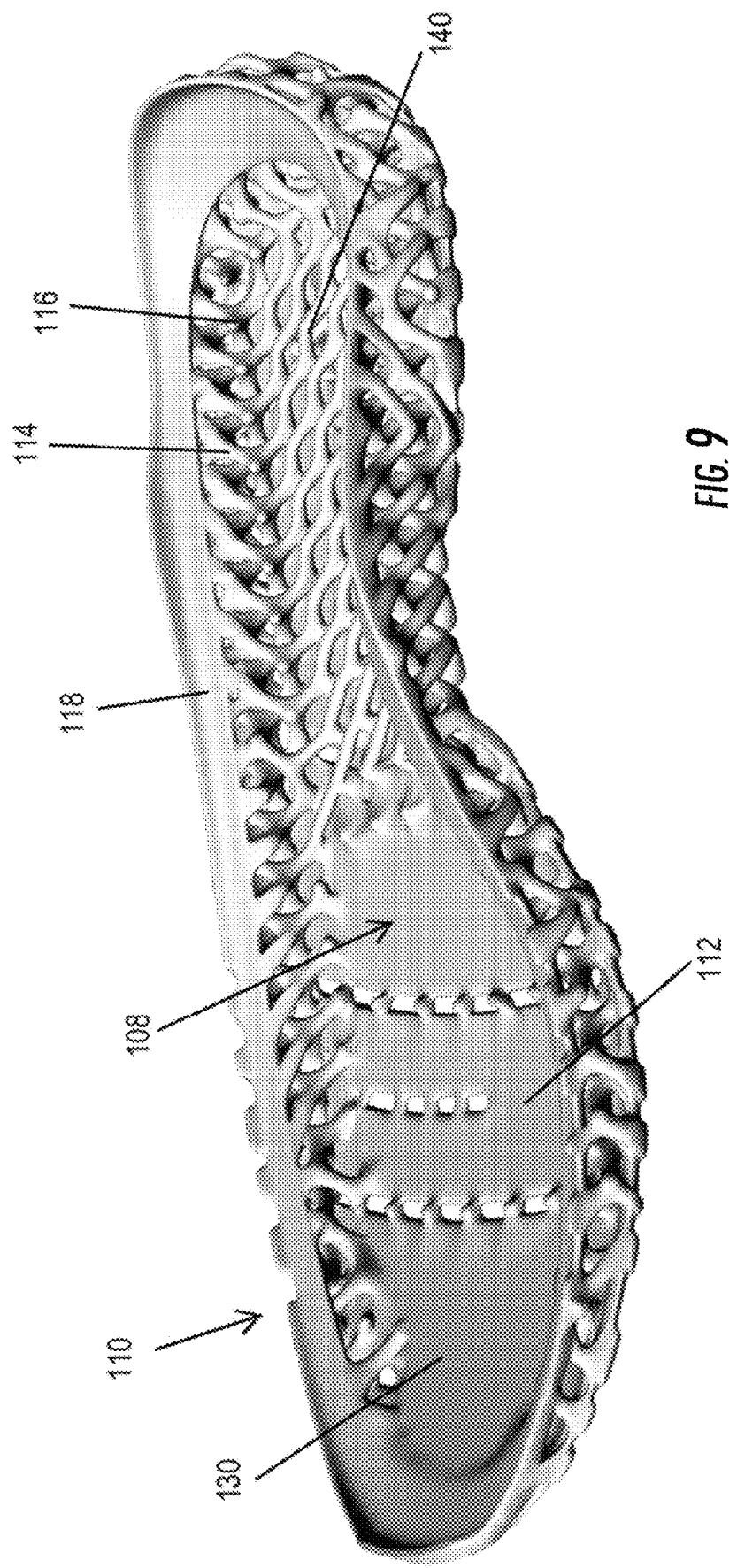
FIG. 9 is a side perspective view of a section of an alternative embodiment of the midsole lattice structure of FIG. 7 wherein the recess extends to a lower platform of the lattice structure.

With reference now to FIG. 9, an alternative embodiment of the lattice structure of FIGS. 7-8 is shown. In this embodiment of FIG. 9, the recess 108 does not extend completely through the height of the lattice structure 110, but only extends down to the lower platform 112 in the forefoot region 130. The recess 108 also extends downward in the heel region 140, but does not extend to the lower platform 112, and instead only extends downward into the network of laths 114, lower than the upper shelf 118. Slits are formed in the lower platform 112 which provide additional flexibility for the forefoot region 130 of the midsole. While the resilient insert 150 is not shown in FIG. 9, it will be recognized that the resilient insert 150 may be provided in any of various forms and configurations. For example, the resilient insert 150 may be provided as a single piece that rests in the recess 108 of FIG. 9 while also extending from the forefoot region 130 to the heel region 140. In this example, the resilient insert 150 may be substantially thicker in the forefoot region 130 than in the heel region 140 since the recess 108 is deeper in the forefoot region 130 than in the heel region 140. As another example, the resilient insert 150 may be a single block-like piece that only rests in the recess 108 in the forefoot region only.

Figure 10:
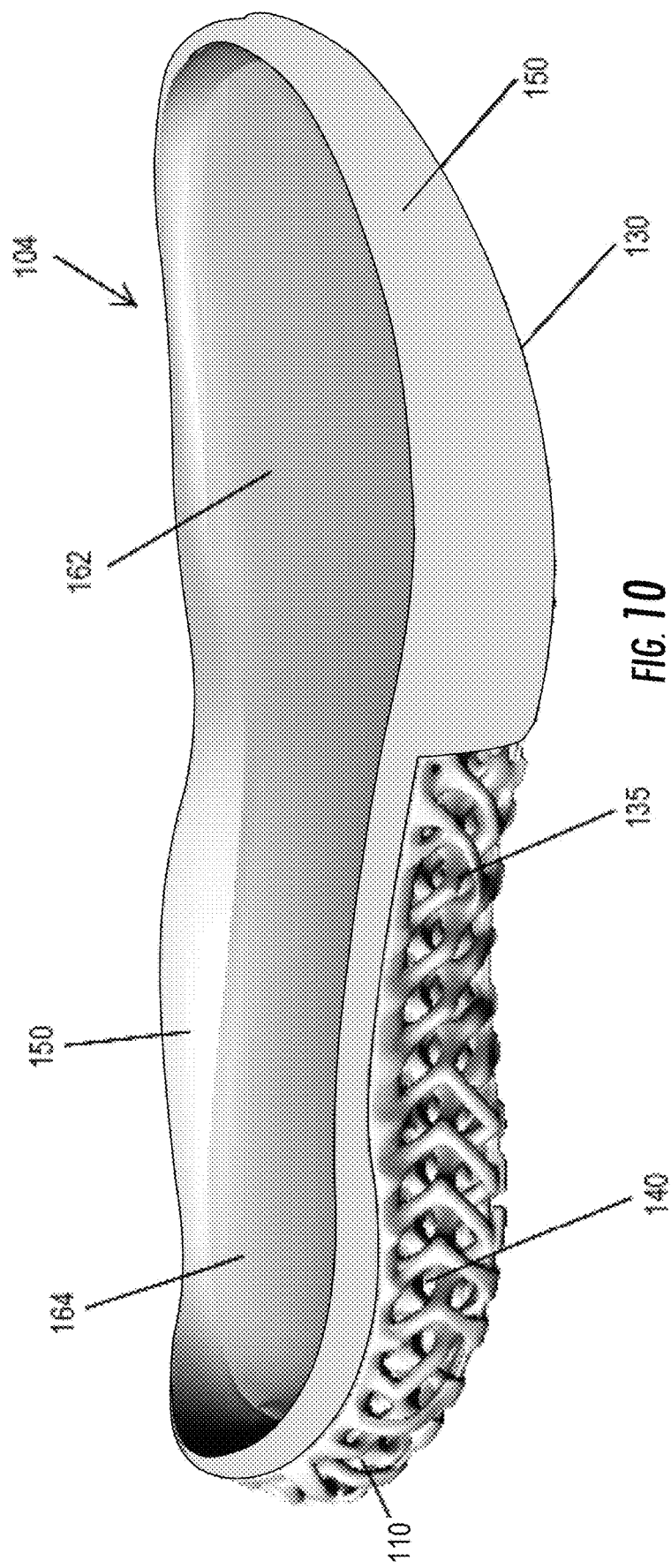
FIG. 10 is an alternative embodiment of the lattice structure of FIG. 2 wherein the lattice structure extends from a heel region to a midfoot region of the midsole, but does not extend to a forefoot region.

With reference now to FIG. 10, yet another exemplary embodiment of a midsole 104 is shown. In this embodiment, the lattice structure 110 does not extend across the entire midsole from the forefoot region 130 to the heel region 140. Instead, the lattice structure 110 extends only across a limited region of the midsole 104. In particular, as shown in FIG. 10, the lattice structure 110 is only provided on the rear half of the midsole 104, extending across the entire heel region 140 but terminating in a midfoot region 135 without extending into the forefoot region 130. In this embodiment, the front portion (e.g., the front half) of the midsole 104 may be provided by another material such as EVA foam or other material. Accordingly, the front portion of the midsole 104 may be considered to be an extension of the insert 150, which also extends to the heel portion 164 of the midsole 104. In such an embodiment, the heel portion 164 of the insert 150 is integrally formed with the forefoot portion 162 of the insert 150. The heel portion 164 may be a relatively flat panel that engages the lattice structure 110, as shown in FIG. 10, while the forefoot portion 162 of the insert 150 may be more block-like and provide the entirety of the midsole 104 in the forefoot region 130. Accordingly, the heel region 140 of the midsole 104 will provide the performance characteristics consistent with the combined lattice structure 110 and resilient insert 150, while the forefoot region 130 of the midsole 104 will provide performance characteristics consistent with that of the resilient insert alone. While FIG. 10 illustrates one exemplary embodiment of an arrangement of the midsole 104 with the lattice structure 110 and the resilient insert 150 provided in different portions of the midsole 104, it will be appreciated that numerous other arrangements are possible, including the lattice structure 110 only in a front portion, a lateral side, a medial side, or a central region of the midsole 104. In each of these embodiments, other materials, such as the EVA foam of the resilient insert 150 may be provided in the remaining portions of the midsole 104. In yet other embodiments, two or more distinct regions may be covered by the lattice structure, such as the forefoot region 130 and the heel region 140, with the region in-between (i.e., the midfoot region 135) covered by the resilient insert.

Figure 11:
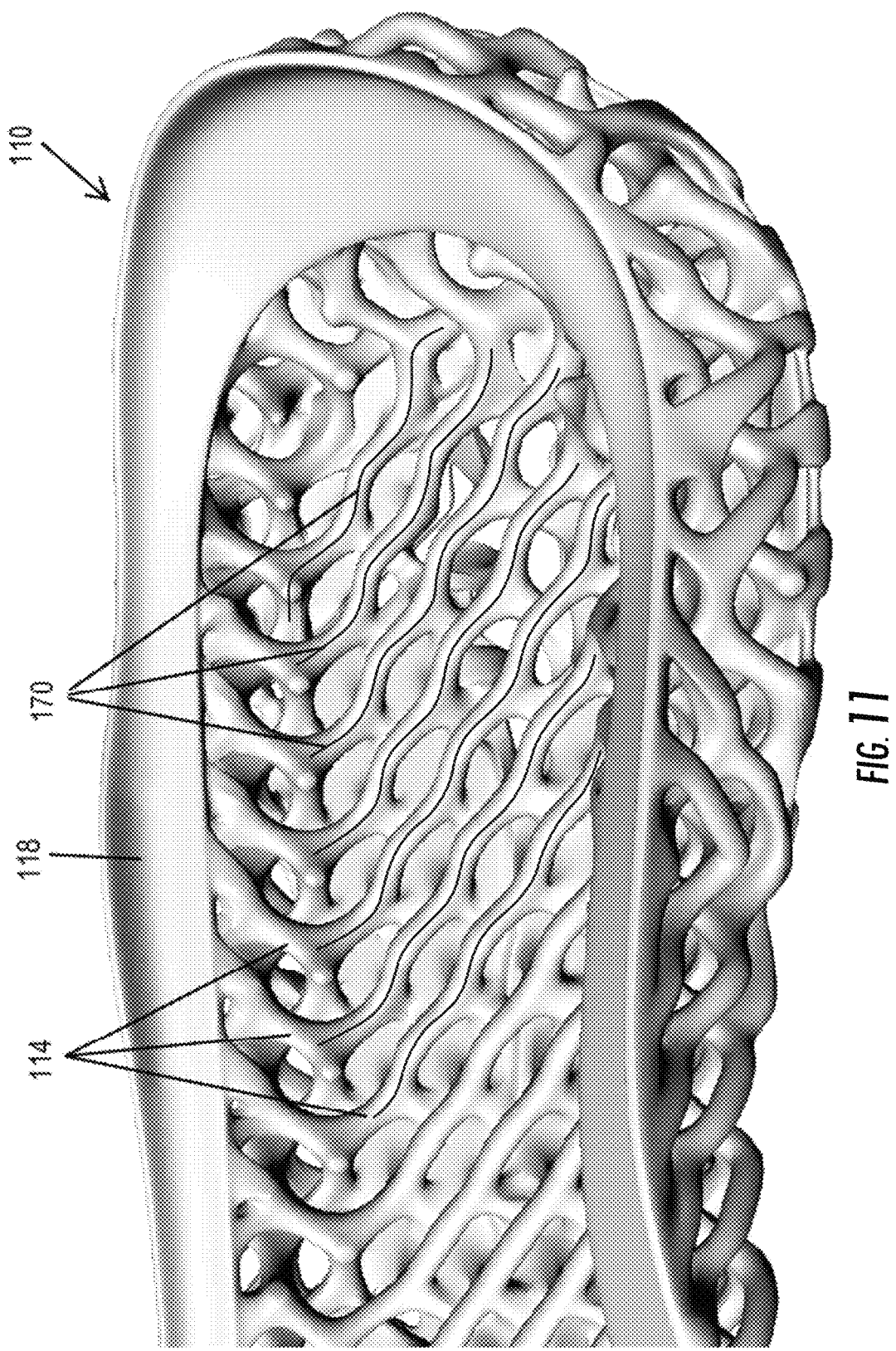
FIG. 11 is a perspective view of a midsole lattice structure with lines illustrating the wave-like structure of the parallel laths in a first layer of the lattice structure.

As discussed above, the lattice structure and the resilient insert may be provided in any of various configurations in order to provide the desired structure and energy return features to targeted areas of the midsole. Additionally, it will also be recognized that the lattice structure 110 including the network of laths 114 and nodes 116 may also be provided in any of various configurations to provide the desired characteristics of the lattice structure 110. In the embodiments of FIGS. 1-10, the laths 114 are provided as wave-like structures that are arranged in alternating layers. Each lath is generally cylindrical with a circular cross-section such that the girth of a lath may be calculated as being equal to $2 \times \pi \times r$, where r is the radius of the circular cross-section of the lath. FIG. 11 illustrates the wave-like structure of the laths 114 with lines 170. Each of the laths 114 is provided in a single layer of the lattice structure. The wave-like structure of the laths 114 is generally sinusoidal. Also, the laths 114 are all substantially parallel to one another in the illustrated layer.

Figure 12:
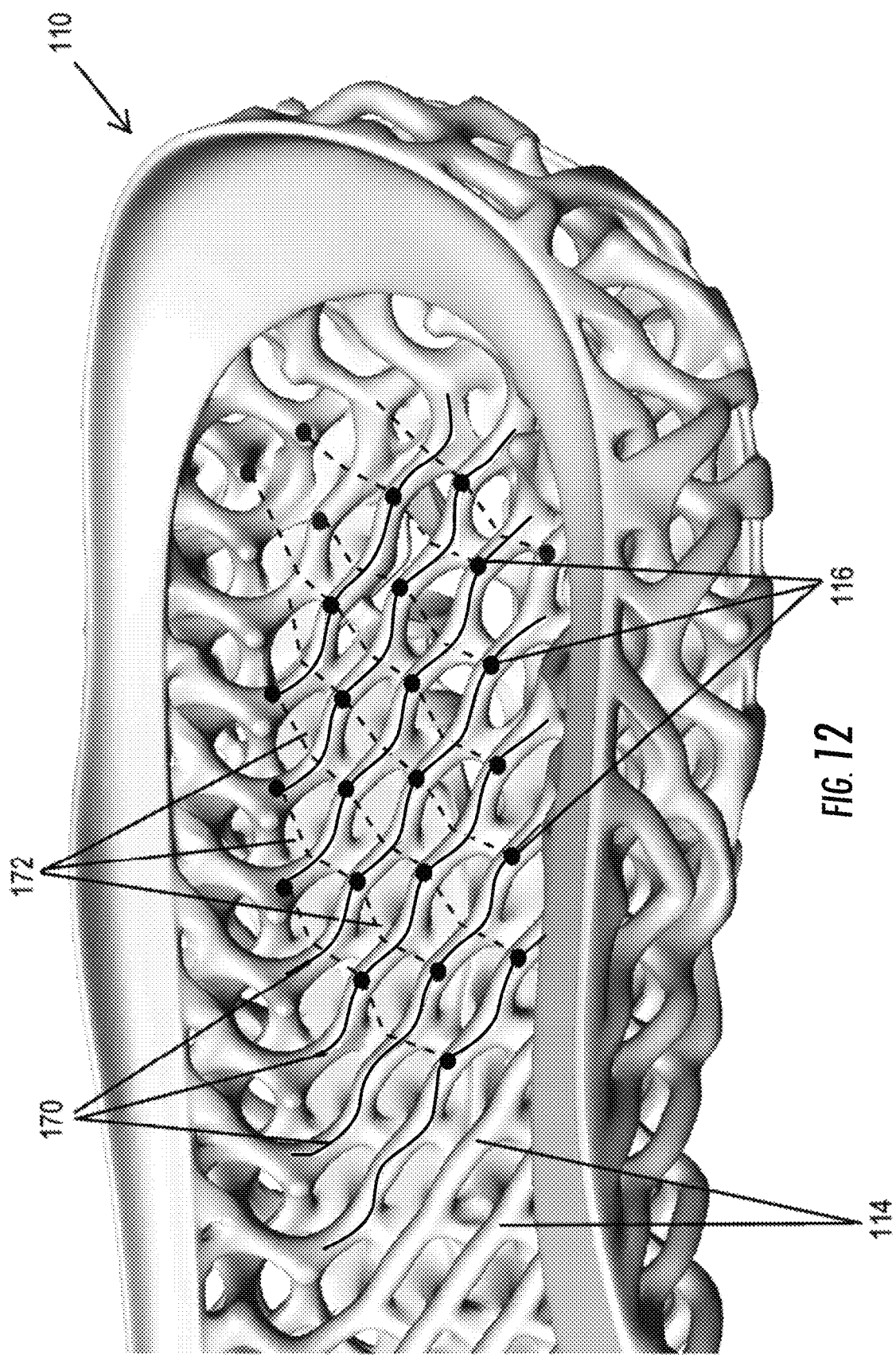
FIG. 12 is a perspective view of the midsole lattice structure of FIG. 11 with dotted lines illustrating the wave-like structure of the parallel laths in a second layer of the lattice structure that is above the first layer.
Figure 13:
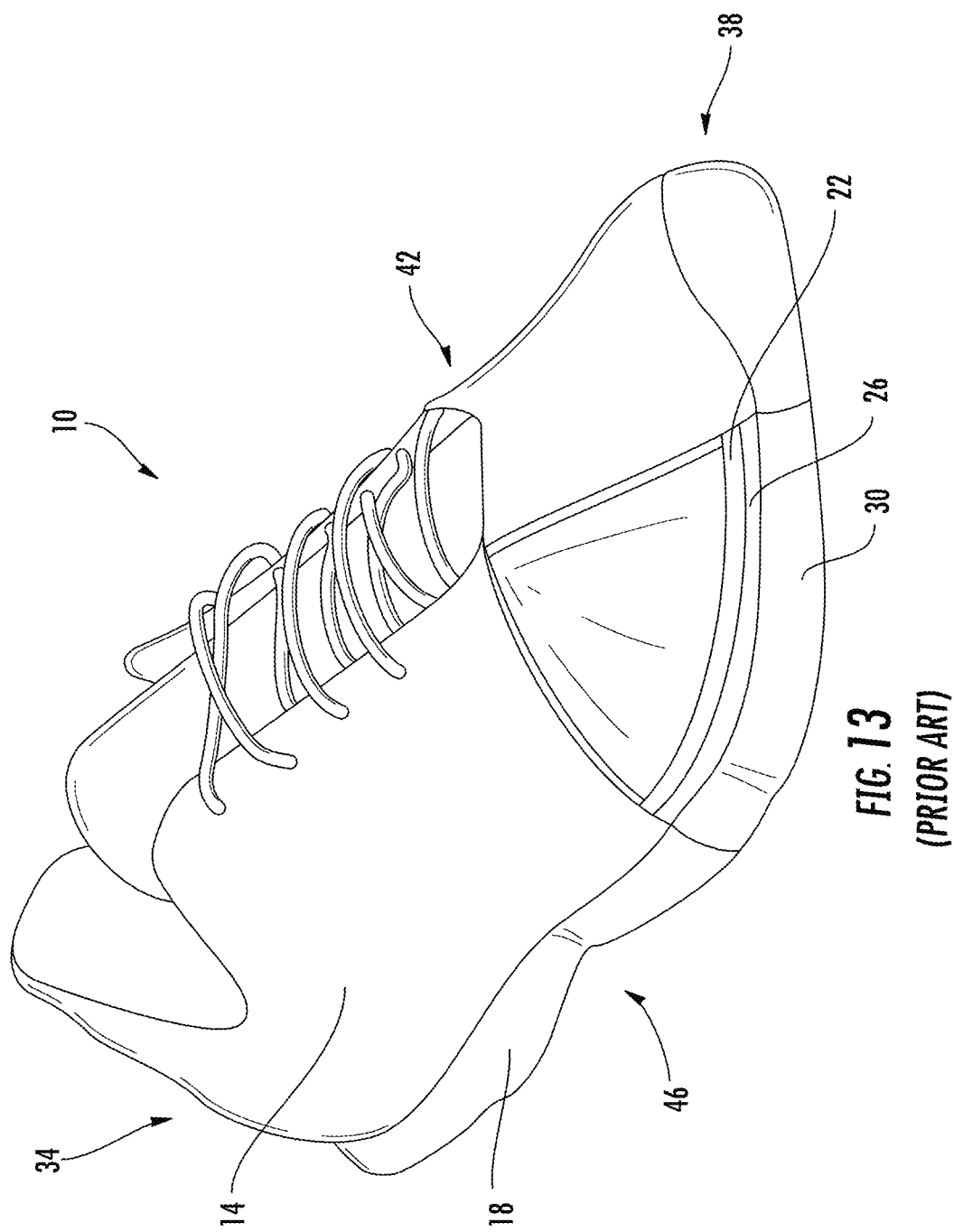
FIG. 13 is a schematic drawing of an article of footwear in the form of shoe as is generally known in the prior art.

FIG. 12 illustrates the arrangement of a second layer of laths 114 with dotted lines 172 extending over the lines 170 (which represent the laths of the first layer). It will be recognized the laths of the second layer of the lattice structure 110 are not shown in FIG. 12 for clarity, but the laths of the second layer follow the pattern of the dotted lines 172. The laths of the second layer are provided on top of the laths of the first layer. Similar to the laths of the first layer, the laths of the second layer are also parallel to each other. However, as can be seen by comparing lines 170 and dotted lines 172, the laths of the second layer are oriented in a transverse direction to the laths 114 of the first layer. In at least one embodiment, the laths of the first layer are oriented about ninety degrees (90°) relative to the laths of the second layer. As shown in FIG. 12, nodes 116 are formed where the laths 114 of the first layer contact the laths of the second layer. The nodes 116 may therefore be considered to be locations wherein the laths of one layer intersect and conjoin with the laths of another layer. In the embodiment of FIG. 12, the nodes are provided at locations where the peaks of the wave-like laths from a lower layer engage the valleys of the wave-like laths from an upper layer. As will be recognized, the lattice structure 110 may include any number of vertically stacked layers and the laths 114 in each alternating layer are transverse to each other.

Figure 14:
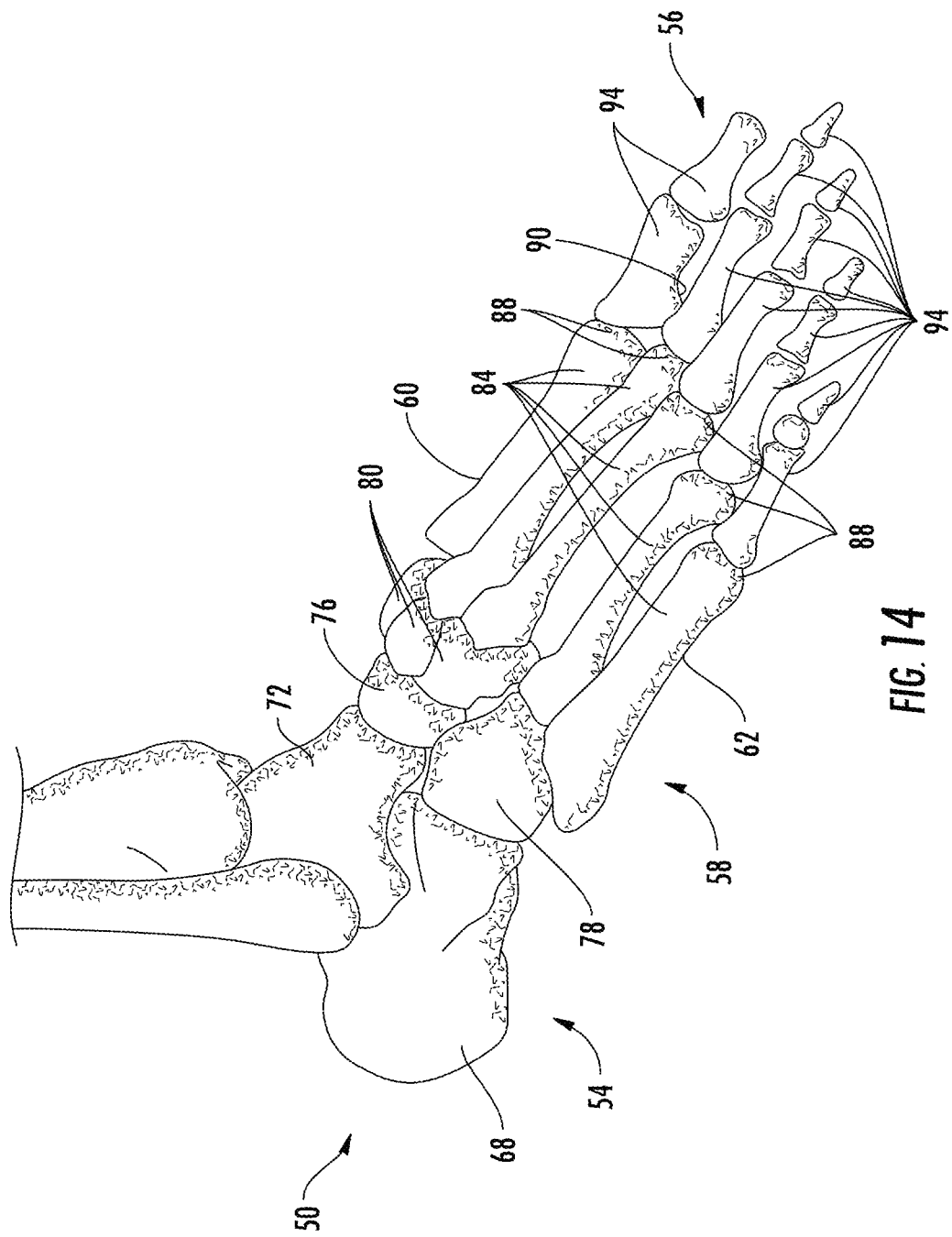
FIG. 14 is a schematic drawing of a medial side view of a bone structure of a foot.
Figure 15:
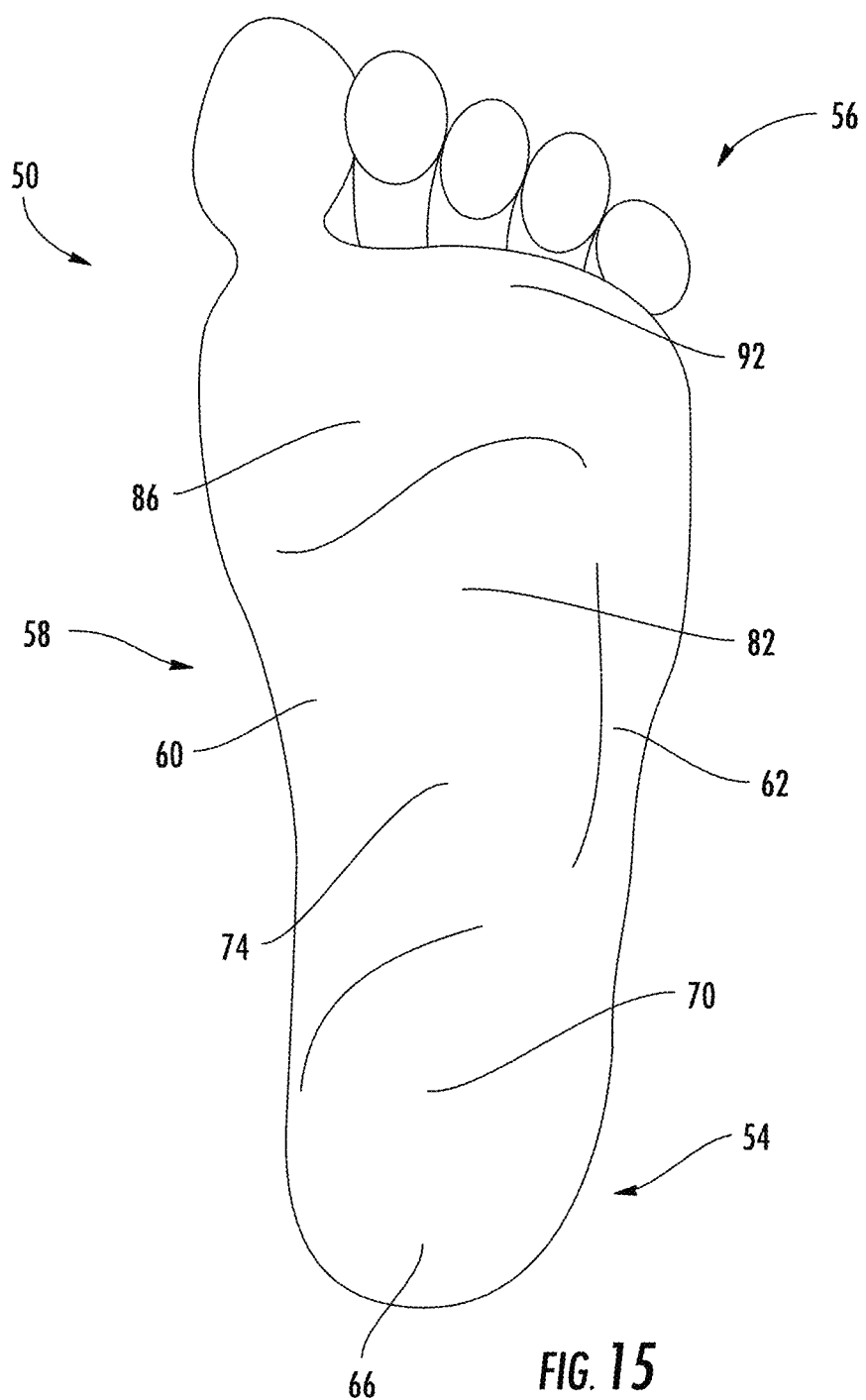
FIG. 15 is a schematic drawing of a bottom view of a foot.

In addition to various lattice configurations, the performance characteristics provided by the lattice structure 110 may also be adjusted by adjusting the dimensions of the elements of the lattice structure. In particular, as described in U.S. patent application Ser. No. 13/829,624, filed Mar. 14, 2013, the contents of which are incorporated herein by reference, the dimensions of the laths 114 may be adjusted to provide increased stability or increased cushioning depending on the desired performance characteristics of the lattice structure in various regions of the midsole. Because the foot 50 (shown in FIGS. 14 and 15) varies in shape and structure between different users, and bears different amounts of pressure in different regions during different stages of a gait cycle, different zones of the lattice structure 110 may differ in shape and structure to provide a desired support for a particular type of foot or gait cycle. For example, the laths 114 located within an arch zone of the lattice structure 110 may have girths that differ from the girths of laths located within a ball of the foot zone. Additionally, within the transition areas between two zones, gradations in lath girth may occur. As a result, relatively smooth transitions of girth may occur when moving from one end of the lattice structure 110 to another, or from one side of the lattice structure to another. In general, thicker girths provide a lattice structure 110 in the associated zone that is more stable and less compressible. On the other hand thinner girths provide a lattice structure 110 in the associated zone that provides more cushion and energy return qualities.

As described above, a two part midsole including a lattice structure and resilient insert may configured in various ways to allow for targeted features in different zones of a midsole. It will be appreciated that the performance characteristics of the midsole may be adjusted as desired based on the arrangement and configuration of the lattice structure and the associated placement of the resilient insert. Additionally, performance characteristics of the midsole may also be adjusted by different configurations in the lattice structure itself or different configurations in the resilient insert. The foregoing detailed description of exemplary embodiments of the footwear with lattice midsole and compression insert has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An article of footwear comprising:
    a midsole including,
        a lattice structure including an upper side and a lower side, wherein the upper side is a user-facing side and the lower side is a ground-facing side, the lattice structure comprised of a network of interconnected laths connected at nodes,
        a first platform integrally formed into the upper side of the lattice structure,
        a second platform integrally formed into the lower side of the lattice structure, wherein the lattice structure extends from the first platform to the second platform;
    an upper disposed above the midsole; and
    an outsole disposed below the midsole.

2. The article of footwear of claim 1 wherein the laths are configured as parallel wave structures in multiple layers, and wherein the wave structures in a first layer are transverse to the wave structures in a second layer.

3. The article of footwear of claim 1 wherein the first platform forms a rim extending around a perimeter of the upper side of the lattice structure.

4. The article of footwear of claim 3 wherein the lattice structure is exposed within the upper shelf.

5. The article of footwear of claim 1 wherein the second platform is a discontinuous lower platform comprising at least one opening, and wherein the lattice structure is exposed by the lower platform through the at least one opening.

6. The article of footwear of claim 1 wherein the second platform spans from a lateral side to a medial side of the article of footwear in a midfoot region of the article of footwear.

7. The article of footwear of claim 1 wherein the lattice structure comprises a network of wave structures arranged multiple transverse layers, wherein peaks of the wave structures in one layer are joined to valleys in the wave structures of an adjacent layer.

8. The article of footwear of claim 1 wherein voids are provided between the plurality of laths and the plurality of nodes, and wherein the midsole is unitary in construction from the first platform to the second platform.

9. The article of footwear of claim 1 wherein the midsole is free of gate marks, sprue marks, parting line marks and ejector pin marks.

10. The article of footwear of claim 1 wherein the midsole extends from a heel region to a forefoot region of the article of footwear.

11. The article of footwear of claim 1 wherein each of the laths is configured as an elongated thin strip of material.

12. A method of manufacturing a midsole for an article of footwear, the method comprising:
    printing a midsole including:
        a lattice structure including a network of laths extending from a user-facing side to a ground-facing side, the network of laths include a plurality of interconnected integrally-formed laths connected at a plurality of nodes,
        a first platform integrally formed into the user-facing side of the lattice structure, and
        a second platform integrally formed into the ground-facing side of the lattice structure, wherein the network of laths extend from the first platform to the second platform;
    coupling an upper to the user-facing side of the midsole; and
    coupling an outsole to the ground-facing side of the midsole.

13. The method of claim 12 wherein the laths are configured as parallel wave structures in multiple layers, and wherein the wave structures in a first layer are transverse to the wave structures in a second layer.

14. The method of claim 12 wherein the first platform forms a rim extending around a perimeter of the upper side of the lattice structure, and wherein the second platform is a discontinuous lower platform comprising at least one opening.

15. The method of claim 12 wherein the second platform spans from a lateral side to a medial side of the article of footwear in a midfoot region of the article of footwear.

16. The method of claim 12 wherein the lattice structure is configured to extend from a heel region to a forefoot region of the midsole.

17. An article of footwear comprising:
   an upper;
   an outsole; and
   a midsole positioned between the upper and the outsole, the midsole including an upper platform, a lower platform, and a lattice structure comprising a network of elongated and cylindrical laths extending between the upper platform and the lower platform, wherein the laths are configured as parallel wave structures in multiple integrally formed layers, and wherein the wave structures in a first layer are transverse to the wave structures in a second layer.

18. The article of footwear of claim 17 wherein upper platform, lower platform, and lattice structure are integrally formed as a unitary structure.

19. The article of footwear of claim 17 wherein the upper platform is an upper shelf that forms a rim extending around a perimeter of an upper side of the lattice structure, and wherein the lattice structure is exposed within the upper shelf.

20. The article of footwear of claim 17 wherein each of the laths has a circular cross-section.

* * * * *